(12) United States Patent
Nelson et al.

(10) Patent No.: US 6,341,624 B1
(45) Date of Patent: Jan. 29, 2002

(54) VALVE FOR CRYOGENIC FLUID

(75) Inventors: Donald R. Nelson, Worcester; Robert L. Russell, West Boylston, both of MA (US)

(73) Assignee: Goddard Valve Corporation, Worcester, MA (US)

(*) Notice: Subject to any disclaimer, the term of this patent is extended or adjusted under 35 U.S.C. 154(b) by 0 days.

(21) Appl. No.: 09/346,792

(22) Filed: Jul. 2, 1999

Related U.S. Application Data

(62) Division of application No. 08/978,470, filed on Nov. 26, 1997, now Pat. No. 5,934,327.

(51) Int. Cl.⁷ .............................................. F16K 11/10
(52) U.S. Cl. ...................................... 137/877; 251/285
(58) Field of Search .............................. 137/527, 877, 137/878, 883, 614.2; 251/285

(56) References Cited

U.S. PATENT DOCUMENTS

| | | | |
|---|---|---|---|
| 1,121,730 A | 12/1914 | Keely | 137/183 |
| 1,555,075 A | 9/1925 | Pownall | 137/886 X |
| 2,287,633 A | 6/1942 | Newcum | 137/883 X |
| 2,821,210 A | 1/1958 | Liley | 137/883 X |
| 3,332,581 A * | 7/1967 | Estabrooks | 137/877 |
| 3,404,865 A | 10/1968 | Nelson | 251/214 |
| 3,464,447 A | 9/1969 | Jones | 137/883 |
| 3,559,950 A | 2/1971 | Nelson | 251/214 |
| 4,664,155 A * | 5/1987 | Archung et al. | 137/877 |
| 4,844,411 A | 7/1989 | Nelson | 251/214 |
| 5,013,009 A | 5/1991 | Nelson | 251/357 |
| 5,226,449 A | 7/1993 | Zimmerly | 137/883 X |
| 5,232,023 A | 8/1993 | Zimmerly | 137/883 X |
| 5,273,075 A | 12/1993 | Skaer | 137/883 |
| 5,335,686 A | 8/1994 | Isringhausen | 137/883 X |
| 5,353,828 A | 10/1994 | Troscinski | 137/883 X |
| 5,551,479 A | 9/1996 | Graves | 137/614.2 |
| RE35,726 E | 2/1998 | Miller et al. | 137/883 X |

FOREIGN PATENT DOCUMENTS

| | | | |
|---|---|---|---|
| AU | 473069 | 11/1975 | F16K/11/22 |
| FR | 643471 | 9/1928 | 137/883 |
| SE | 81333 | 6/1934 | 137/883 |

OTHER PUBLICATIONS

Bestobell Valves Product Literature, Meggitt Energy, "The Complete Cryogenic Valve Package", 1 page (See Part III of the Information Disclosure Statement).
Wolverine Product Literature, MVE, Inc. "Wolverine Specifications", 2 pages (See Part III of the Information Disclosure Statement).

* cited by examiner

*Primary Examiner*—John Fox
(74) *Attorney, Agent, or Firm*—Wolf, Greenfield & Sacks, P.C.

(57) ABSTRACT

A valve for cryogenic fluids that divides incoming fluid into separate outlets. The valve prevents the inadvertent leakage or reverse flow of fluid through the valve using a swing-type check valve, and may also remove undesirable debris from the fluid. The valve comprises a valve housing and at least one valve actuator. The housing includes an inlet and at least one outlet, and has an inlet chamber and at least one outlet chamber that are adapted to receive fluid from the inlet and deliver the fluid to the outlet. The inlet chamber and the outlet chamber are fluidly coupled by a valve aperture that is defined by a valve seat. The valve actuator cooperates with the valve seat to seal the inlet chamber from the outlet chamber. In one embodiment, the valve includes a check valve that is pivotally mounted in the valve housing to prevent fluid flow from the valve housing through the inlet. In another embodiment, the valve includes a pair of outlets, a pair of outlet chambers and a pair of valve actuators. In a further embodiment, the valve includes a filter that is disposed in the housing between the inlet and the outlets to remove debris from the fluid.

13 Claims, 4 Drawing Sheets

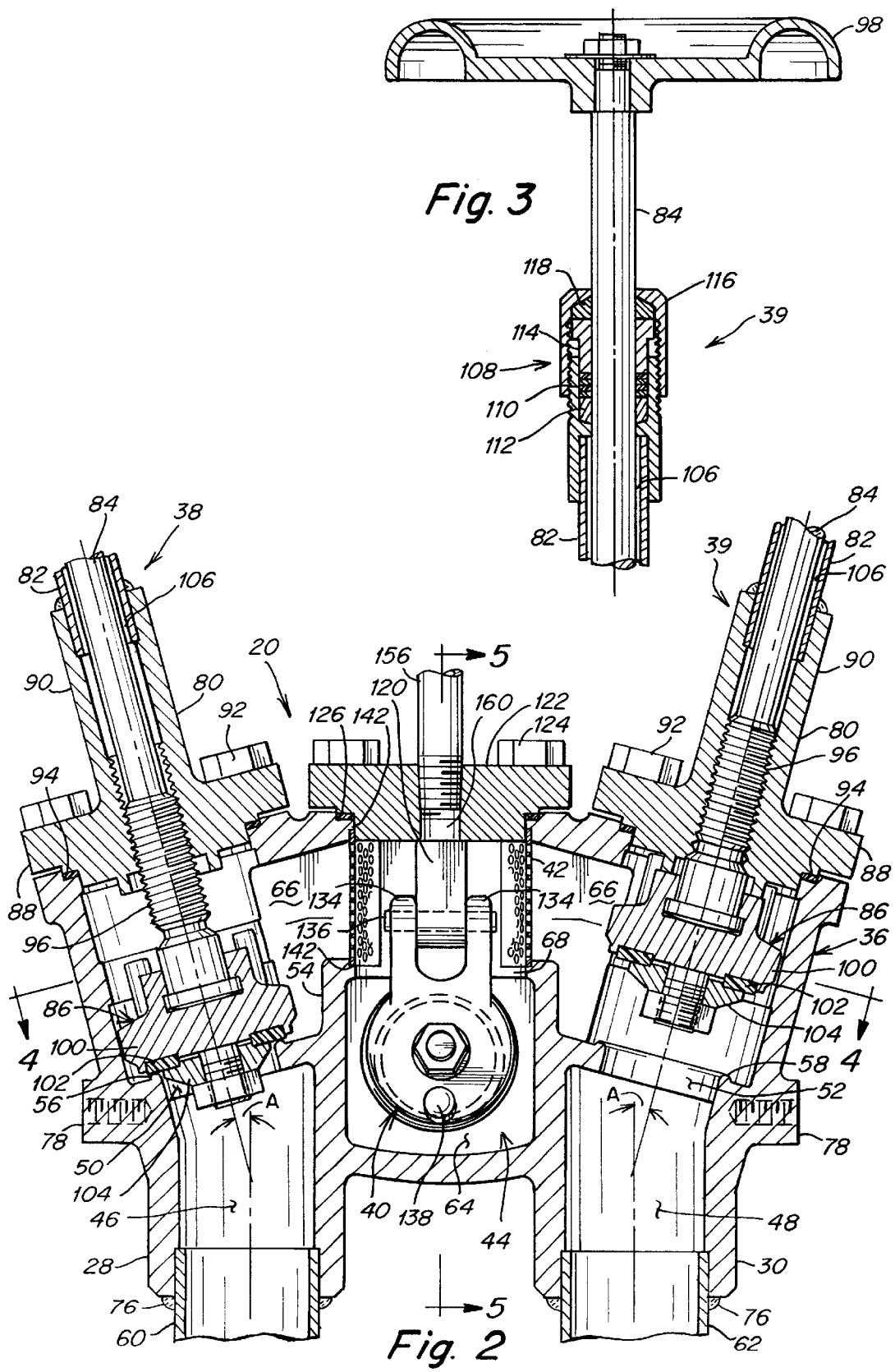

VALVE FOR CRYOGENIC FLUID

This application is a divisional of application Ser. No. 08/978,470, filed Nov. 26, 1997, entitled VALVE FOR CRYOGENIC VALVE, and now U.S. Pat. No. 5,934,327.

BACKGROUND OF THE INVENTION

1. Field of the Invention

This invention relates to a valve and, more particularly, a valve for controlling the flow of cryogenic fluid.

2. Discussion of the Related Art

Cryogenic fluids, such as liquid nitrogen, liquid oxygen or the like, are often stored on-site at a facility for use in various applications. For example, a hospital may store liquid oxygen on-site for medical uses, or a company may store liquid nitrogen at its facility for manufacturing processes. Conventionally, a cryogenic fluid is held in a storage tank at a temperature and pressure that maintains the fluid in a liquid state for future usage in a gaseous state.

Cryogenic fluids are conventionally delivered to a facility in a transportable supply tank from which the fluid can be pumped through a fluid delivery system into the storage tank. The fluid delivery system often includes a complex arrangement of valves and piping for controlling the flow of fluid to the storage tank, as well as for preventing fluid leakage from the tank. The cryogenic fluid typically is pumped to both the top and the bottom of the storage tank requiring that the piping be split into two feed lines which are connected to the top and bottom of the storage tank.

Under some circumstances, cryogenic fluid may inadvertently flow out of the storage tank and either back through the fluid delivery system into the supply tank or escape into the atmosphere. For example, when transferring fluid to the storage tank, the pressure in the storage tank may exceed the capacity of the fluid delivery pump resulting in reverse flow from the storage tank into the supply tank. As another example, an individual may fail to close one or more valves resulting in fluid leakage onto the ground or into the atmosphere from the storage tank when the supply tank is disconnected from the storage tank.

Valves have been proposed that utilize a poppet check valve to prevent inadvertent reverse flow through the valve housing. Poppet check valves, however, are typically complex mechanisms that utilize preloaded springs for actuating the poppet valve in response to a predetermined pressure differential across the check valve.

Valves for use at cryogenic temperatures face an increased possibility of leakage through relatively small openings or seams due to shrinkage of the valve components when subjected to cryogenic temperatures. Thus, cryogenic valves require precisely fabricated valve components to ensure fluid tight shell and seat performance. The introduction of foreign matter or debris into the valve can interfere with the valve components, particularly the valve seat seals, resulting in fluid seepage through the valve. Additionally, unfiltered debris, particularly large scale debris, that pass through the fluid delivery system can potentially interfere with the operation of process equipment or other systems within the facility.

In view of the foregoing, it is an object of the present invention to provide an improved valve, particularly a valve for use with cryogenic fluids, that reduces the possibility of inadvertent reverse flow through the valve and limits the introduction of foreign matter.

SUMMARY OF THE INVENTION

The present invention is a valve for controlling the flow of cryogenic fluid from an inlet to a pair of outlets using a pair of valve actuators. The valve prevents fluid from inadvertently leaking or flowing back through the valve inlet using a relatively simple swing-type check valve. The valve may also filter undesirable debris from the fluid as it passes through the valve.

In one illustrative embodiment, the valve comprises a valve housing that includes an inlet, a first outlet and a second outlet, and has an inlet chamber, a first outlet chamber and a second outlet chamber that are adapted to receive fluid from the inlet and deliver the fluid to the first and second outlets. The inlet chamber and the first outlet chamber are fluidly coupled by a first valve aperture defined by a first valve seat, and the inlet chamber and the second outlet chamber are fluidly coupled by a second valve aperture defined by a second valve seat. First and second valve actuators cooperate with the first and second valve seats to seal the inlet chamber from the first and second outlet chambers. A check valve is pivotally mounted in the valve housing to prevent fluid flow from the valve housing through the inlet.

In another illustrative embodiment, the valve comprises a valve housing that includes an inlet, a first outlet and a second outlet, and has an inlet chamber, a first outlet chamber and a second outlet chamber that are adapted to receive fluid from the inlet and deliver the fluid to the first and second outlets. The inlet chamber and the first outlet chamber are fluidly coupled by a first valve aperture defined by a first valve seat, and the inlet chamber and the second outlet chamber are fluidly coupled by a second valve aperture defined by a second valve seat. First and second valve actuators cooperate with the first and second valve seats to seal the inlet chamber from the first and second outlet chambers. A filter is disposed in the housing between the inlet and the first and second outlets to remove debris from the fluid.

In a further illustrative embodiment, the valve comprises a valve housing that includes an inlet and an outlet, and has an inlet chamber and an outlet chamber that are adapted to receive fluid from the inlet and deliver the fluid to the outlet. The inlet chamber and the outlet chamber are fluidly coupled by a valve aperture defined by a valve seat. A valve actuator cooperates with the valve seat to seal the inlet chamber from the outlet chamber. A check valve is pivotally mounted in the valve housing to prevent fluid flow from the valve housing through the inlet.

BRIEF DESCRIPTION OF THE DRAWINGS

It should be understood that the drawings are provided for the purpose of illustration only and are not intended to define the limits of the invention. The foregoing and other objects and advantages of the present invention will become apparent with reference to the following detailed description when taken in conjunction with the accompanying drawings in which:

FIG. 2 is a cross-sectional end view of the valve taken along section line 2—2 in FIG. 1 illustrating one valve actuator in a closed position and the other valve actuator in an open position;

FIG. 3 is a cross-sectional view of the valve stem taken along section line 3—3 in FIG. 1;

DETAILED DESCRIPTION

Figure 1:
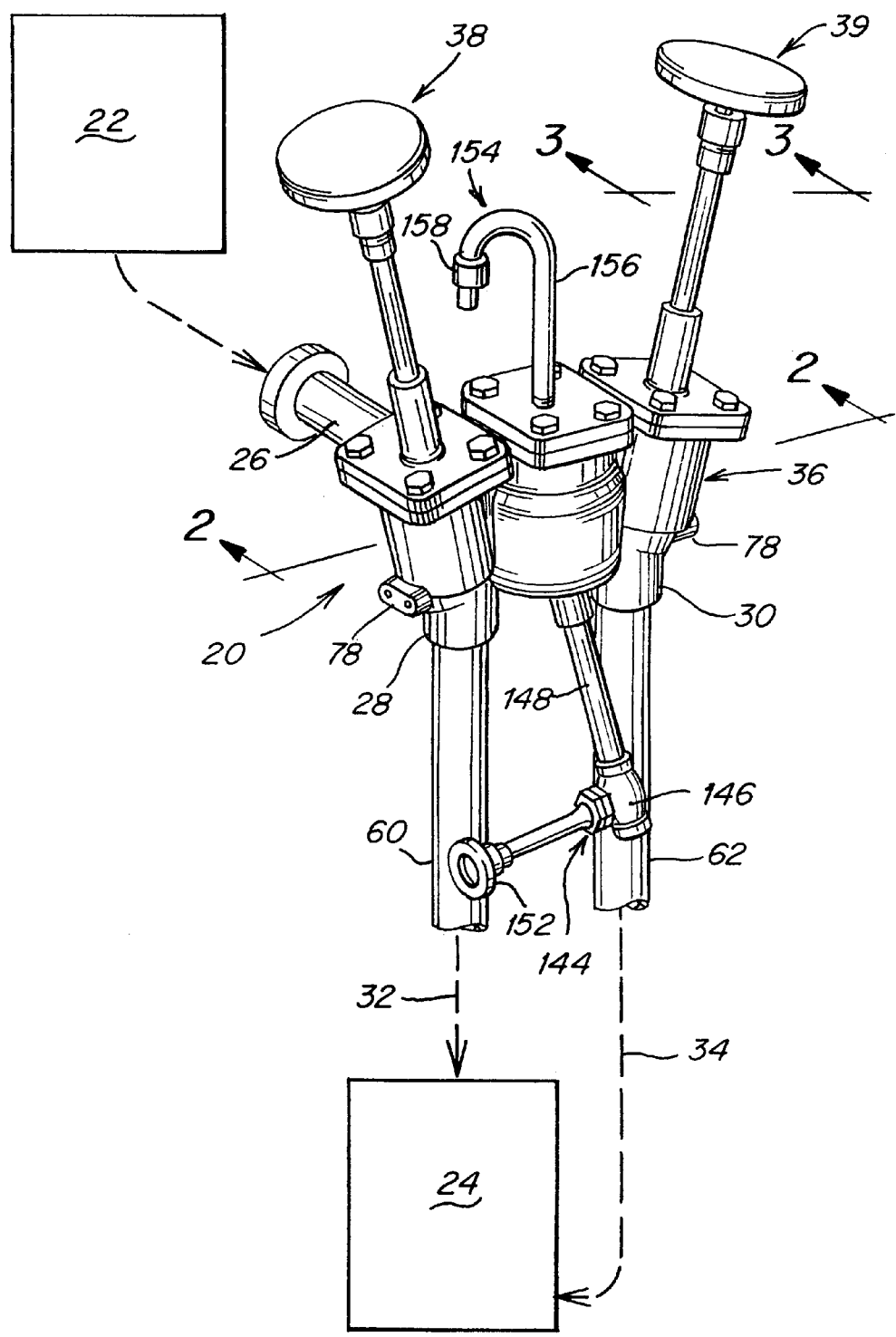
FIG. 1 is a perspective view of one embodiment of a valve of the present invention schematically illustrating the valve coupled to a supply tank and a storage tank.
Figure 4:
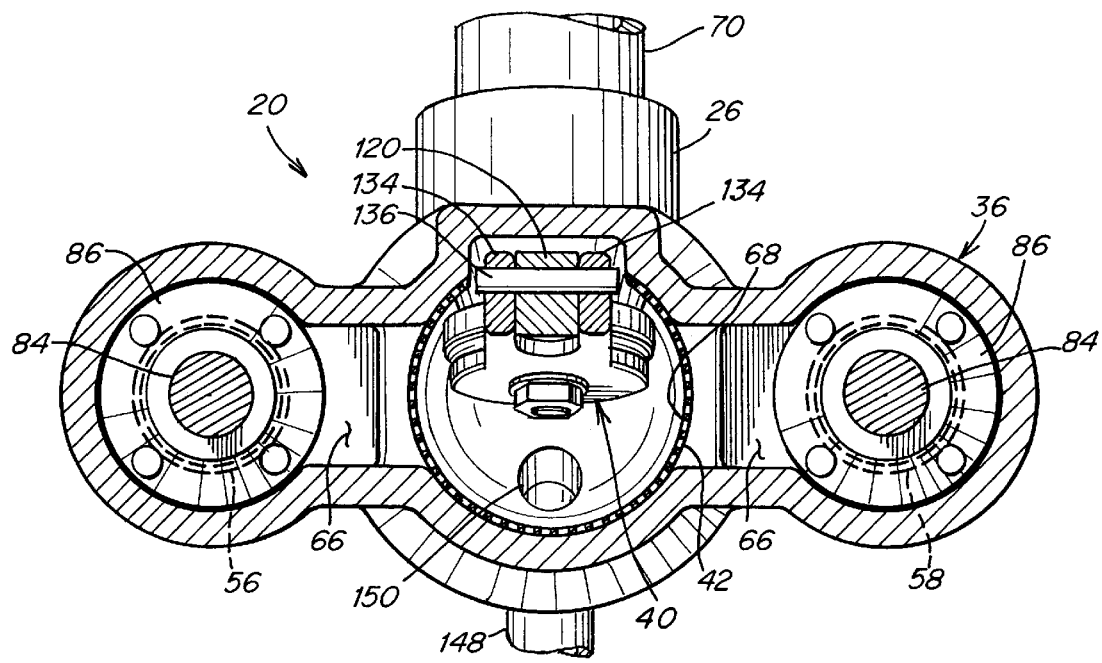
FIG. 4 is a cross-sectional plan view of the valve taken along section line 4—4 in FIG. 2.

A valve 20 for controlling fluid flow, particularly cryogenic fluid, may be fluidly coupled between a supply tank 22 and a storage tank 24, as illustrated in FIG. 1, as part of a fluid delivery system that transfers fluid from the supply tank 22 to the storage tank 24. The supply tank 22 is coupled to a single valve inlet 26 and the storage tank 24 is coupled to a pair of valve outlets 28, 30. The valve 20 advantageously divides the incoming fluid into separate feed lines 32, 34 to the storage tank, thereby reducing the complexity and increasing the reliability of the fluid delivery system. Additionally, the valve 20 may prevent fluid in the storage tank 24 from inadvertently flowing back through the valve either into the supply tank 22 or out to the atmosphere. The valve 20 may also filter undesirable debris from the fluid as it passes through the valve to reduce the risk of interfering with the operation of the valve itself or other equipment located downstream from the valve.

In one embodiment illustrated in FIGS. 1–4, the valve 20 includes a housing 36, a pair of globe valve actuators 38, 39 for controlling fluid flow to the valve outlets 28, 30, a check valve 40 for preventing reverse flow through the valve, and a filter 42 for restricting the size of debris that can pass through the valve. The valve actuators 38, 39 are independently controllable so that the fluid flow to the valve outlets 28, 30 can be selectively adjusted. Although globe valve actuators are described herein, it should be understood that the present invention may be used with other valve types as would be apparent to one of skill in the art. Additionally, since the valve actuators are identical in the illustrative embodiment, like parts are given like reference characters.

The housing includes a single valve inlet 26 and a pair of valve outlets 28, 30 which are fluidly coupled to the valve inlet 26 via internal valve chambers that divide the incoming fluid into separate feed lines. In one illustrative embodiment, the housing 36 has an inlet chamber 44 and a pair of outlet chambers 46, 48 that are fluidly coupled to the inlet chamber 44 via apertures 50, 52 disposed through an internal partition wall 54 that separates the chambers from each other. In particular, the inlet chamber 44 is fluidly coupled to the first outlet chamber 46 via a first aperture 50 that is defined by an annular first outlet valve seat 56. Similarly, the inlet chamber 44 is fluidly coupled to the second outlet chamber 48 via a second aperture 52 that is defined by an annular second outlet valve seat 58. The first and second outlet chambers 44, 46 may be coupled to outlet conduits 60, 62 which can be connected to the first and second valve outlets 28, 30. The inlet chamber 44 itself is separated into a lower inlet chamber 64 and an upper inlet chamber 66 which are coupled to each other via a third aperture 68 in the partition wall 54. The lower inlet chamber 64 is coupled to the valve inlet 26, which can be connected to an inlet conduit 70, via an inlet aperture 72 defined by an annular inlet valve seat 74.

Fluid that is delivered to the valve through the valve inlet 26 enters the lower inlet chamber 64 and flows into the upper valve chamber 66 through the third aperture 68. From the upper valve chamber 66, the fluid then flows to one or both of the outlet chambers 46, 48 as controlled by the positions of the valve actuators 38 relative to the outlet valve seats 56, 58. For example, as shown in FIG. 2, fluid will flow only from the upper inlet chamber 66 to the second outlet chamber 48 because the first outlet chamber 46 is sealed from the inlet chamber by the first valve actuator 38 which is closed against the first outlet valve seat 56.

The housing 36 is preferably a unitary structure that advantageously reduces the number of joints, which in turn reduces the potential sources of leaks as well as the cost of the valve. The housing preferably is a bronze casting that may be subsequently joined to stainless steel or copper piping with conventional Sil-brazed joints 76. As illustrated in FIGS. 1 and 2, the housing 36 may include mounting bosses 78 that can be used to mount the valve on a support structure.

In one illustrative embodiment as shown in FIGS. 1–2, the valve outlets 28, 30 are disposed on the housing 36 along parallel vertical axes and the valve actuators 38, 39 are each disposed on the housing at an angle A relative to the axes of the outlets to reduce the overall size of the housing. The valve actuators 38, 39 are removably mounted to an upper portion of the housing 36 so that the valve actuators can be easily inserted into and removed from the housing through relatively large openings to perform maintenance on the valve. In one embodiment, the angle A of each valve actuator 38, 39 is approximately 15°. However, it should be understood that the angle A of the actuators 38, 39 can vary, for example, from 0° to approximately 45°.

In one embodiment shown in FIGS. 1–3, each globe valve actuator 38, 39 generally includes a bonnet 80, an extension tube 82, a valve stem 84 and a valve seal 86 that can be seated against an outlet valve seat 56, 58 to seal the inlet chamber 44 from the corresponding outlet chamber 46, 48. The bonnet 78 includes a flange portion 88 and an upwardly extending cylindrical neck 90 to which is secured the extension tube 82, preferably using a heat fusion process (e.g., welding, brazing or the like) to create a leak-free joint. The bonnet 80 is mounted to the upper portion of the housing using suitable fasteners 92 (e.g., bolts or the like). A bonnet gasket 94 is disposed between the flange portion 88 and the housing 36 to prevent fluid leakage from the housing at the bonnet interface. The gasket is preferably formed from a plastic material, such as polytetrafluoroethylene (PTFE), although other suitable materials may be used.

The valve stem 84 is an elongated member, preferably cylindrical, that extends through the extension tube 82 and bonnet 80 into the interior of the valve housing to support the valve seal 86 in the housing. The lower portion of the valve stem includes external threads 96 which cooperate with corresponding internal threads in the bonnet 80 so that rotation of the stem 84 is translated into axial movement of the stem to raise and lower the valve seal 86. The upper end of the valve stem 84 extends from the upper end of the extension tube 86 and supports a conventional knob or handle 98 that can be actuated to adjust the position of the valve seal 86.

As shown in FIG. 2, the valve seal 86 is supported on the lower end of the valve stem 84 within the housing so that it can be raised and lowered relative to the outlet valve seat 56, 58. In one embodiment, the valve seal 86 includes a disc holder 100 and a valve disc 102 that is secured to the disc holder using suitable fasteners, such as a disc washer 104 and a nut. The disc washer 104 may have a generally conical surface to provide a throttling effect between the valve seal 86 and the valve seat 56, 58 for enhanced control of the flow through the valve. The valve disc 102 is preferably formed from a plastic material, such as KEL-F or PTFE, or other suitable material apparent to one of skill, and has a solid, continuous lower surface that extends outwardly beyond the annular surface of the valve seat 56, 58.

The stem 84 is supported in spaced relation to the extension tube 82 to form an annulus 106 therebetween so that the stem can rotate and move axially relative to the extension tube to raise and lower the valve seal 86. A stem packing seal 108 is provided at the upper end of the extension tube 82 to prevent leakage from the valve along the valve stem 84. In one illustrative embodiment shown in FIG. 3, the stem packing seal 108 includes a series of stacked rings 110 sandwiched between a lower adapter 112 and a packing sleeve follower 114 that are compressed with a packing nut 116 to seal the valve stem 84. A conically-shaped bearing 118 may be disposed between the packing sleeve follower 114 and the packing nut 116 to laterally support the valve stem 84. Preferably, the rings 110 include a series of alternating metal (e.g., brass) and plastic (e.g., PTFE) rings as disclosed in U.S. Pat. No. 4,844,411 issued to Donald R. Nelson, which is incorporated herein by reference. It should be understood that other suitable stem packing arrangements and materials may be used to prevent leakage of fluid along the valve stem as would be apparent to one of skill.

Cryogenic fluid present in the upper inlet chamber 66 may seep past the stem threads 96 and into the annulus 106 between the stem 84 and extension tube 82 toward the upper end of the stem, thereby lowering the temperature at the stem packing seals 108. By reducing the size of the annulus 106 and increasing the length of both the stem 84 and the extension tube 82, heat gain along the length of the extension tube causes the liquid to vaporize with a resulting pressure increase in the annulus that prevents additional liquid cryogen from seeping into the annulus. Thus, the vaporization of the liquid cryogen, controlled in part by the length of the stem 84 and extension tube 82, operates to prevent the stem packing seals 108 from freezing by substantially reducing the amount of liquid cryogen present in the annulus 106 and maintaining that liquid a sufficient distance from the stem packing seals.

As indicated above, the valve 20 includes a check valve 40 for preventing a reverse flow of fluid through the valve inlet. In an illustrative embodiment shown in FIGS. 2, 4 and 5, the check valve 40 is a swing-type check valve that is supported in the lower inlet chamber 64 of the valve housing adjacent the inlet valve seat 74. In particular, the check valve 40 is pivotally mounted to a support arm 120 that extends downwardly from a cover plate 122 and into the inlet chamber through a relatively large opening in the housing 36 between the valve actuators 38, 39. The cover plate 122 is removably secured to the housing using fasteners 124 (e.g., bolts or the like) so that the check valve 40 can be easily removed from the housing 36 to perform maintenance on the check valve itself or other internal components of the valve. A gasket 126 is disposed between the cover plate 122 and the valve housing 36 to prevent leakage of fluid from the housing. The location of the cover plate 122 between the valve actuators 38, 39 at the upper portion of the housing is a significant advantage because it provides easy access to the inlet chamber 44 without the need to first remove the valve housing from the fluid delivery system. Preferably, the gasket 126 is formed from a plastic material, such as PTFE, although other suitable materials may be used.

The check valve 40 includes a swing member 128, a disc holder 130 and an annular disc 132 supported by the disc holder. The disc 132 can be secured to the disc holder with suitable fasteners, such as a disc washer and nut, that mate with a threaded stud extending from the disc holder through the disc. The disc holder 130 can be secured to the swing member with suitable fasteners, such as a washer and nut, that engage a threaded stud extending from the disc holder through the swing member 128. As shown in FIG. 2, the swing member 128 includes a pair of extensions 134 that are disposed on opposite sides of the support arm 120 to hingedly support the check valve on the support arm with a pin 136 or other suitable fastener. Preferably, the disc 132 is formed from a plastic material, such as KEL-F or PTFE, although other suitable materials may be used as would be apparent to one of skill in the art.

Figure 5:
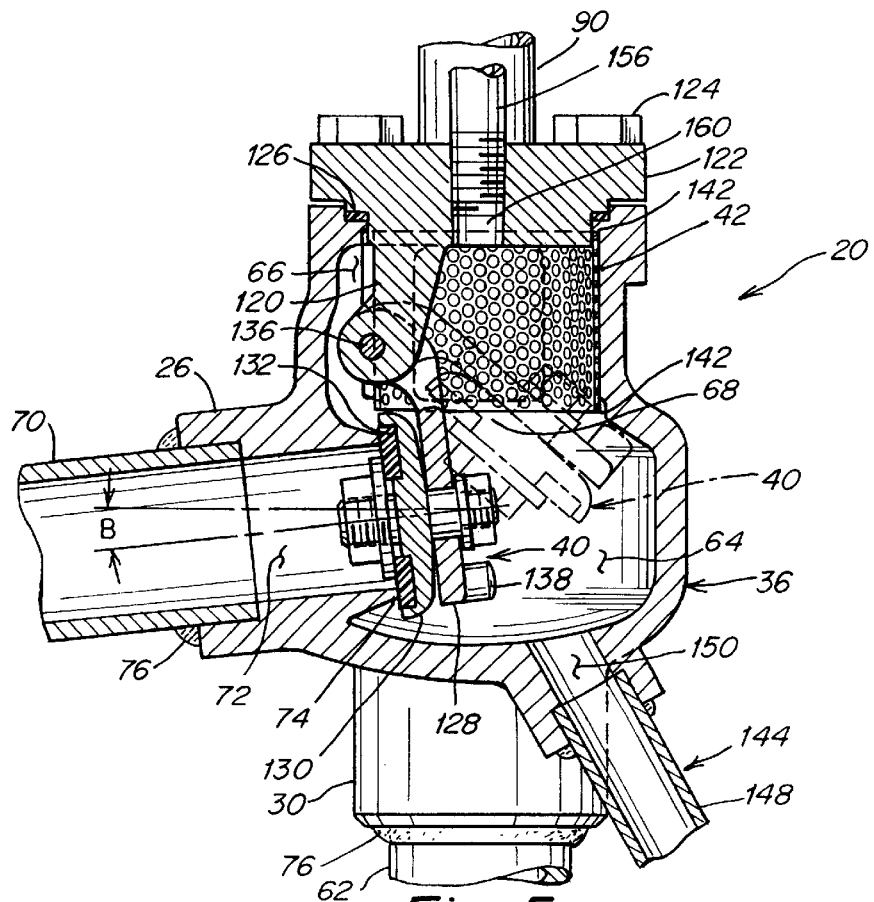
FIG. 5 is a cross-sectional side view of the valve taken along section line 5—5 in FIG. 2 illustrating the check valve in a closed position in solid lines and in an open position in phantom lines.

As illustrated in FIG. 5, when fluid is pumped through the valve inlet 26, the pressure of the fluid causes the check valve 40 to swing upwardly (shown in phantom) away from the inlet valve seat 74 so that the fluid can enter the lower inlet chamber 64 for subsequent distribution through the valve outlets 28, 30. When fluid is no longer pumped through the valve or the pressure at the valve inlet is no longer sufficient to sustain fluid flow through the valve, the check valve 40 swings downwardly under the influence of gravity against the inlet valve seat 74. The check valve 40 is forced tightly against the inlet valve seat 74 by back pressure within the valve housing to seal the valve inlet 26 against reverse flow. The sealing effectiveness of the check valve 40 may be further enhanced by positioning the valve inlet 26 so that it extends away from the housing 36 at a downward angle B relative to a horizontal plane with the inlet valve seat 74 being similarly angled relative to a vertical plane. In one embodiment, the inlet 26 is disposed at an angle B of approximately 6° and is perpendicular to the inlet valve seat.

The check valve may include a stop to limit its rotation as it opens to admit fluid flow through the valve housing. In one embodiment shown in FIGS. 2 and 5, the check valve 40 includes a stop 138 disposed on the swing member 128 which engages a portion of the housing wall to limit the rotation of the check valve. This advantageously reduces the amount of momentum that the check valve 40 can acquire and transmit to the valve housing 36 in the form of an impact force upon being opened. It also reduces the distance that the check valve 40 must rotate to seal the valve inlet 26 against reverse flow.

Figure 6:
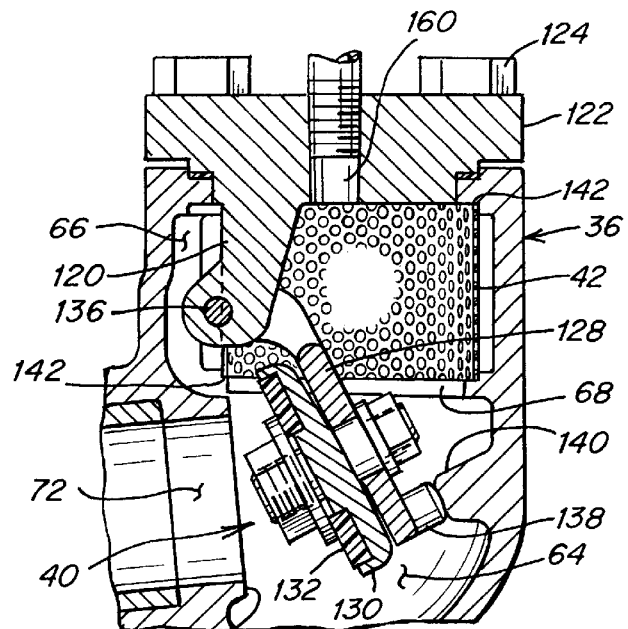
FIG. 6 is a fragmented cross-sectional side view similar to FIG. 5 illustrating an alternate embodiment of a stop for limiting the travel of the check valve.

In another embodiment illustrated in FIG. 6, the valve housing 36 includes a boss 140 or other suitable protrusion disposed on the housing wall to further limit the rotation of the check valve 40 and reduce the impact force on the wall. The length of the stop 138 and/or the boss 140 can be varied to adjust the amount of check valve rotation within the valve.

The valve 20 also includes a filter 42 for limiting the size of debris that can pass through the valve. In one embodiment illustrated in FIGS. 2 and 4–6, the filter 42 encloses the third aperture 68 between the lower and upper inlet chambers 64, 66 to prevent debris of particular size from passing into the upper inlet chamber 66 from which it could potentially damage the valve actuators 38, 39 and valve seats 56, 58 as well as be carried through the valve and into the fluid delivery system. The filter 42 is positioned along a lip 142 in the partition wall 54 and the upper portion of the housing about the access opening. The filter 42 may be a flexible sheet of material with spring-like characteristics (e.g., a perforated metal sheet, a screen or the like) that is rolled into a generally circular shape to produce a radially outward force that helps retain the filter in position within the lip 142. The size of the apertures in the filter may be selected based on the filtering requirements for a particular application. As should be appreciated, the filter can readily be exchanged with other filters having different size apertures to adjust the filtering characteristics of the valve.

The location of the filter 42 in the upper inlet chamber 66 about the third aperture 68 has several advantages. For example, the filter 42 is highly accessible, so that it can be cleaned or replaced, by removing the cover plate 122 and check valve 40 from the upper portion of the housing. Once exposed, the filter 42 can easily be grasped and removed from the valve housing. Additionally, debris that is trapped by the filter 42 generally will fall downwardly due to gravity, particularly when fluid flow through the valve ceases, and collect in the bottom of the lower inlet chamber 64 for subsequent removal from the valve.

The valve 20 may include a purge system 144 that can be used to remove collected debris from the inlet chamber. Additionally, the purge system 144 may be used to purge the fluid delivery system of atmospheric air immediately prior to the fluid transfer process to avoid contaminating the cryogenic fluid valve. In one illustrative embodiment shown in FIGS. 1, 4 and 5, the purge system 144 includes a purge valve 146 that is disposed at one end of a conduit 148 extending downwardly from the lower portion of the valve housing 36. The conduit 148 is fluidly coupled to the lower inlet chamber 64 of the housing via a purge port 150 that extends through the lower wall of the housing. The purge valve 146 is readily actuated by a stem and handle assembly 152.

The valve 20 may also include a thermal relief device 154 for releasing excessive internal pressure from the valve that may result from fluid vaporization due to an increase in temperature. In one embodiment as illustrated in FIG. 1, the thermal relief device 154 includes an inverted generally U-shaped conduit 156 and a spring loaded, pressure sensitive valve 158 that is disposed at the outlet of the conduit. The opposite end of the conduit 156 is attached to the cover plate 122 (FIG. 5) and is fluidly coupled to the upper inlet chamber 66 through a relief hole 160 in the cover plate. As illustrated, the outlet of the relief device is downwardly directed so that foreign matter, such as dirt and precipitation, does not obstruct the outlet.

Figure 7:
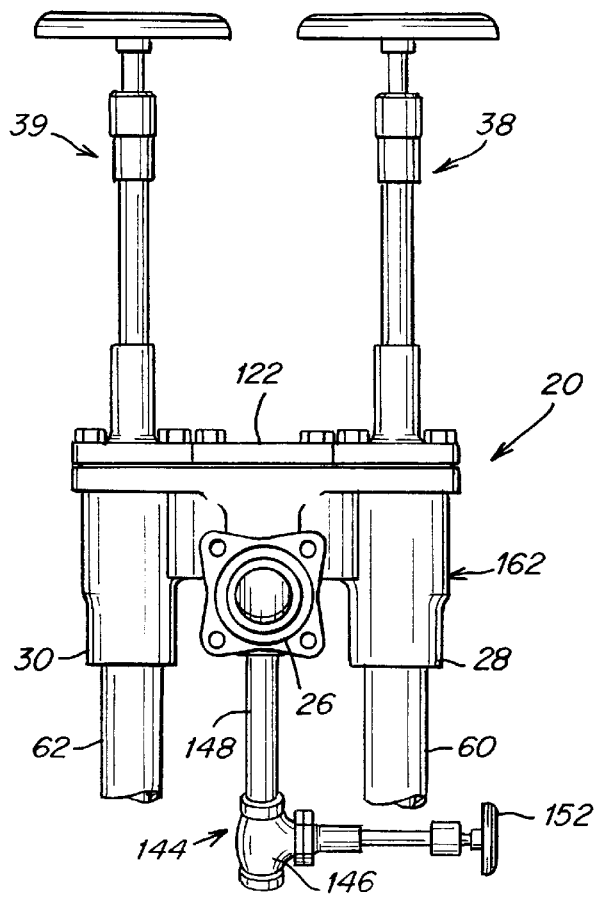
FIG. 7 is a front view of another embodiment of a valve that includes parallel aligned valve actuators.
Figure 8:
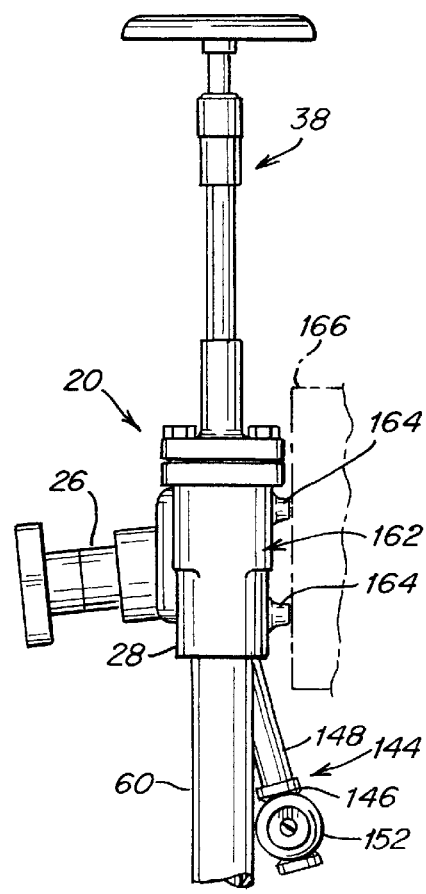
FIG. 8 is a side view of the valve of FIG. 7.

In another illustrative embodiment as shown in FIGS. 7 and 8, the valve 20 includes a pair of parallel valve actuators 38, 39 that are axially aligned with a corresponding pair of parallel valve outlets 28, 30. This arrangement uses a valve housing 162 that can be produced using a less complex fabrication process. The housing 162 may include mounting bosses 164 disposed on its side opposite the valve inlet 26 so that the valve can be mounted to a support structure 166. The operational features of the valve are substantially identical to those illustrated in FIGS. 1–6 and as described above.

Having described several embodiments of the invention in detail, various modifications and improvements will readily occur to those skilled in the art. Such modifications and improvements are intended to be within the spirit and scope of the invention. Accordingly, the foregoing description is by way of example only and is not intended as limiting. The invention is limited only as defined by the following claims and the equivalents thereto.

What is claimed is:

1. A valve comprising:
    a valve housing including an inlet, a first outlet and a second outlet, the housing having an inlet chamber, a first outlet chamber and a second outlet chamber that are adapted to receive fluid from the inlet and deliver the fluid to the first and second outlets, the inlet chamber and the first outlet chamber being fluidly coupled by a first valve aperture defined by a first valve seat, the inlet chamber and the second outlet chamber being fluidly coupled by a second valve aperture defined by a second valve seat;
    a first valve actuator cooperating with the first valve seat to seal the inlet chamber from the first outlet chamber;
    a second valve actuator cooperating with the second valve seat to seal the inlet chamber from the second outlet chamber; and
    a check valve pivotally mounted in the valve housing to prevent fluid flow from the valve housing through the inlet.

2. The valve recited in claim 1, wherein the check valve is disposed in the inlet chamber.

3. The valve recited in claim 2, wherein the inlet chamber is fluidly coupled to the inlet through an inlet aperture defined by an inlet valve seat, the check valve cooperating with the inlet valve seat to seal the inlet against fluid flow from the inlet chamber.

4. The valve recited in claim 3, wherein the first and second valve actuators and the first and second outlets are disposed in a first plane, the inlet valve seat being disposed in a second plane that intersects the first plane.

5. The valve recited in claim 4, wherein the inlet is perpendicular to the second plane.

6. The valve recited in claim 3, wherein the inlet chamber includes a first inlet chamber and a second inlet chamber, the first inlet chamber being fluidly coupled to the inlet and the second inlet chamber being fluidly coupled to the first and second outlet chambers, the inlet valve seat being disposed in the first inlet chamber.

7. The valve recited in claim 1, wherein at least one of the check valve and the housing includes a stop to limit the movement of the check valve within the housing.

8. The valve recited in claim 7, wherein the stop includes a boss extending from an interior wall of the housing.

9. The valve recited in claim 1, further comprising a detachable cover plate supported on a portion of the housing that is accessible when the housing is mounted to a support structure to provide access to the check valve.

10. The valve recited in claim 9, wherein the cover plate is disposed on the housing between the first and second valve actuators.

11. The valve recited in claim 9, wherein the cover plate includes a support arm extending therefrom into the inlet chamber, the check valve being mounted to the support arm.

12. The valve recited in claim 1, wherein the first and second valve actuators are individually actuable to selectively adjust fluid flow from the inlet to the first and second outlets.

13. The valve recited in claim 1, wherein the valve is constructed and arranged to control cryogenic fluid.

* * * * *